US006529740B1

(12) United States Patent
Ganucheau, Jr. et al.

(10) Patent No.: US 6,529,740 B1
(45) Date of Patent: Mar. 4, 2003

(54) GROUP RADIO WITH SUBSCRIBER-RADIO CONTROLLED CHANNEL SELECTION

(75) Inventors: Charles Joseph Ganucheau, Jr., Mesa, AZ (US); Jonathan David Stosz, Gilbert, AZ (US); Rhett Garrett Hayden, Chandler, AZ (US); Dean Paul Vanden Heuvel, Mesa, AZ (US); Scott David Blanchard, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,024

(22) Filed: Dec. 10, 1999

(51) Int. Cl.[7] .............................. H04B 7/00; H04Q 7/20
(52) U.S. Cl. ...................... 455/519; 455/520; 455/13.2; 455/502; 370/324
(58) Field of Search .................................. 455/515, 516, 455/517, 518, 519, 520, 521, 59, 427, 428, 11.1, 12.1, 13.1, 13.2, 503; 370/312, 315, 316, 324; 340/7.46, 10.32

(56) References Cited

U.S. PATENT DOCUMENTS

| 5,551,058 A | 8/1996 | Hutcheson et al. ........ 455/33.2 |
| 5,574,968 A | 11/1996 | Olds et al. .................. 455/12.1 |
| 5,577,022 A | 11/1996 | Padovani et al. .............. 370/13 |
| 5,640,676 A | 6/1997 | Garncarz et al. .......... 455/33.2 |
| 6,073,014 A | * 6/2000 | Blanchard et al. .......... 455/428 |
| 6,185,430 B1 | * 2/2001 | Yee et al. .................... 455/519 |
| 6,219,548 B1 | * 4/2001 | Feltner et al. ............... 455/433 |
| 6,292,670 B1 | * 9/2001 | Kauria et al. ............... 455/518 |
| 6,301,263 B1 | * 10/2001 | Maggenti .................... 370/462 |
| 6,377,560 B1 | * 4/2002 | Dailey ........................ 370/329 |

* cited by examiner

Primary Examiner—Edward F. Urban
Assistant Examiner—Temica M. Davis
(74) Attorney, Agent, or Firm—Frank J. Bogacz

(57) ABSTRACT

A point-to-multipoint (PTM) communication system (20) includes a cellular radio infrastructure (22) having base stations (32) implemented in satellites (34) placed in low earth orbits (38). PTM subscriber radios (24) share common cellular radio infrastructure (22) multipoint channels (52) to engage in a common PTM communication session while the cellular radio infrastructure (22) also conveys point-to-point communications. A group control computer (28) constructs a channel list (126) which is downloaded to PTM subscriber radios (24). The channel list (126) identifies multipoint channels (52) and indicates when and where the channels (52) are active. Without emitting transmissions to the cellular radio infrastructure (22), PTM subscriber radios (24) autonomously switch to new multipoint channels (52) in response to their current time and location and the channel list (126).

27 Claims, 8 Drawing Sheets

GROUP RADIO WITH SUBSCRIBER-RADIO CONTROLLED CHANNEL SELECTION

TECHNICAL FIELD OF THE INVENTION

This invention relates to a group radio communication system which implements point-to-multipoint communications. More specifically, the present invention relates to a point-to-multipoint radio sub-network which is formed using a cellular radio infrastructure wherein subscriber radios within the sub-network control the selection of channels over which point-to-multipoint communications take place.

BACKGROUND OF THE INVENTION

Point-to-multipoint (PTM) refers to a communication circuit in which a single signal goes from one originating group member to many destination or target group members. PTM communication can be implemented by sharing common communication resources among many users. PTM communication has been long practiced in connection with commercial broadcast radio and television, where the origination point remains static and the communication resources are allocated for very long durations. However, the origination point may also shift, as occurs in two-way and dispatch radio.

A PTM communication session may take place for an indefinite period of time on the scale of weeks, months, or years, for several hours, or for a shorter duration. Within a PTM communication session, a monolog occurs when one group member is originating information that is being broadcast to the other members of the group. The duration of a monolog is desirably controlled by the group member originating the monolog. When the originator ceases to originate information, the monolog ceases. Desirably, that group member or other group members may originate another monolog thereafter within the same communication session; however, nothing requires any group member to originate a monolog at any given instant. For voice communications, a monolog typically lasts only a few seconds, although nothing requires any particular duration.

In contrast to the long-term resource allocation of PTM, point-to-point (PTP) communication refers to a temporary circuit dedicated to the communication and with essentially two ends. A PTP communication is often referred to as a "call." A call setup process is performed to allocate the resources which will be dedicated to the call. Upon completion of the call, the resources used to transport communications are typically de-allocated whereupon they may be re-allocated to a different call. In voice communications, a call may last for any duration, but a typical call lasts for only a few minutes. During a typical voice call, the identity of the talking party shifts between the ends of the circuit many times during the call, with each party typically talking for only a few seconds at time.

A conference call represents a hybrid between PTM and PTP. A conference call is typically implemented by forming one PTP circuit for each end of the conference call and bridging the other ends of each PTP circuit together. Many users share the pool of PTP circuits, but the PTP circuits are allocated during a call setup process and de-allocated after the call.

Potential advantages of PTM include a more efficient use of connectivity resources, less expense due to the more efficient use of resources, and ease of providing group connectivity. PTP has advantages of privacy and better odds of being able to provide connectivity between two given ends, assuming a large pool of resources for allocation to calls. Accordingly, PTP connectivity has become popular, and a large infrastructure of wire line, radio, and fiber resources has been built to provide PTP connectivity. However, a need exists for PTM connectivity, particularly in connection with mobile radio communications, which tend to be more expensive due to the scarcity of radio spectrum resources, and in connection with groups, such as business, civic, and military organizations.

Conventional PTM or group radio communication systems suffer several problems which limit their ability to capitalize on the advantages potentially achievable over PTP systems. One problem is that conventional group radio systems fail to use the RF spectrum available to the system efficiently. This failure results in undesirably high connectivity costs and defeats one of the advantages that PTM potentially has over PTP. In addition, it limits the number of subscribers that can be connected together in a group.

For example, if a conventional group radio system follows a conference call paradigm and uses different channels for different users of a group, with the different channels being bridged together, at least as many of the scarce radio channel resources are used for the entire PTM session as would be used to implement the same number of PTP calls for that time period. The number of participants in a group of subscribers will be limited to the number of channels available in a given area. Even if a conference call paradigm is not followed and multiple subscriber radios share some common RF channels to convey user traffic, RF spectrum inefficiencies nevertheless can result if additional RF channels are required to carry signaling and to conduct signal acquisition.

Another problem is that conventional group radio systems often fail to use existing communication infrastructures efficiently, resulting in increased costs and limited coverage areas. Existing communication infrastructures, and particularly cellular radio infrastructures, are typically configured to optimize the delivery of PTP communications. However, infrastructure costs are typically low on a per-user basis because they are shared by a vast number of users, and the coverage area may be up to worldwide.

Another problem is that conventional radio systems often adopt practices that, when applied to a group radio system, fail to provide rapid session management response times. If a group radio system were to follow a PTP call paradigm and engage in a call setup process for each monolog, in which channels are allocated on a monolog-by-monolog basis, an excessive amount of latency would exist between the time a group member wishes to initiate a monolog and when the channels are actually allocated so that the monolog may commence. While subscribers may tolerate lengthy latencies for a PTP call setup, lengthy latencies associated with each PTM monolog would be extremely dissatisfying for subscribers. This problem would be exacerbated if a satellite-based cellular radio infrastructure were relied upon in some way to implement the group radio system because latencies inherent in propagation delays associated with satellite communications would be added to channel allocation delays.

Another problem is that conventional radio systems often adopt practices that, when applied to a group radio system, cause battery-powered devices to consume excessive power. Battery powered devices, such as mobile radios and satellites, should consume as little power as possible while still accomplishing their tasks so that battery reserves are maximized and/or smaller batteries may be used. When such devices are incorporated in group radio communication systems, transmissions from such devices which are not necessary to convey subscriber traffic lead to excessive power consumption. However, conventional radio systems often adopt system designs that cause excessive transmissions for system overhead purposes, such as signaling, maintaining traffic channels, and managing channel selection, rather than for the conveyance of subscriber traffic.

Yet another problem is that conventional radio systems can adopt practices that, when applied to a group radio system, lead to unreliable operation. Fading channels and dropped calls are well known vexations of radio communications systems. Conventional radio systems adopt system designs for which the goal, which is met with varying degrees of success, is to have radios operate on the highest quality channels available at each instant. However, the problem faced by PTM radio systems is more acute than that faced by PTP systems. If a channel fades or is dropped for the monolog originator, then all members of the group, not just the couple of participants in a PTP call, are affected. Hence the consequences of a dropped call are worse in a PTM radio system.

Moreover, a group member in a PTM communication session, which may span a considerable duration, should listen to a group broadcast continuously throughout the session whether or not a monolog is active because a monolog may start at any time. Conventional radio system design practices in which radios spend considerable time scanning for better channels are unworkable in a group radio communication system because they would reduce the time available for listening to the group broadcast. Of course, a group radio might employ two receivers so that one receiver could continuously scan for better channels while the other listens to the group broadcast, but this approach would increase cost and power consumption, thus lessening the potential advantages of a PTM radio system.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF A PREFERRED EMBODIMENT

Figure 1:
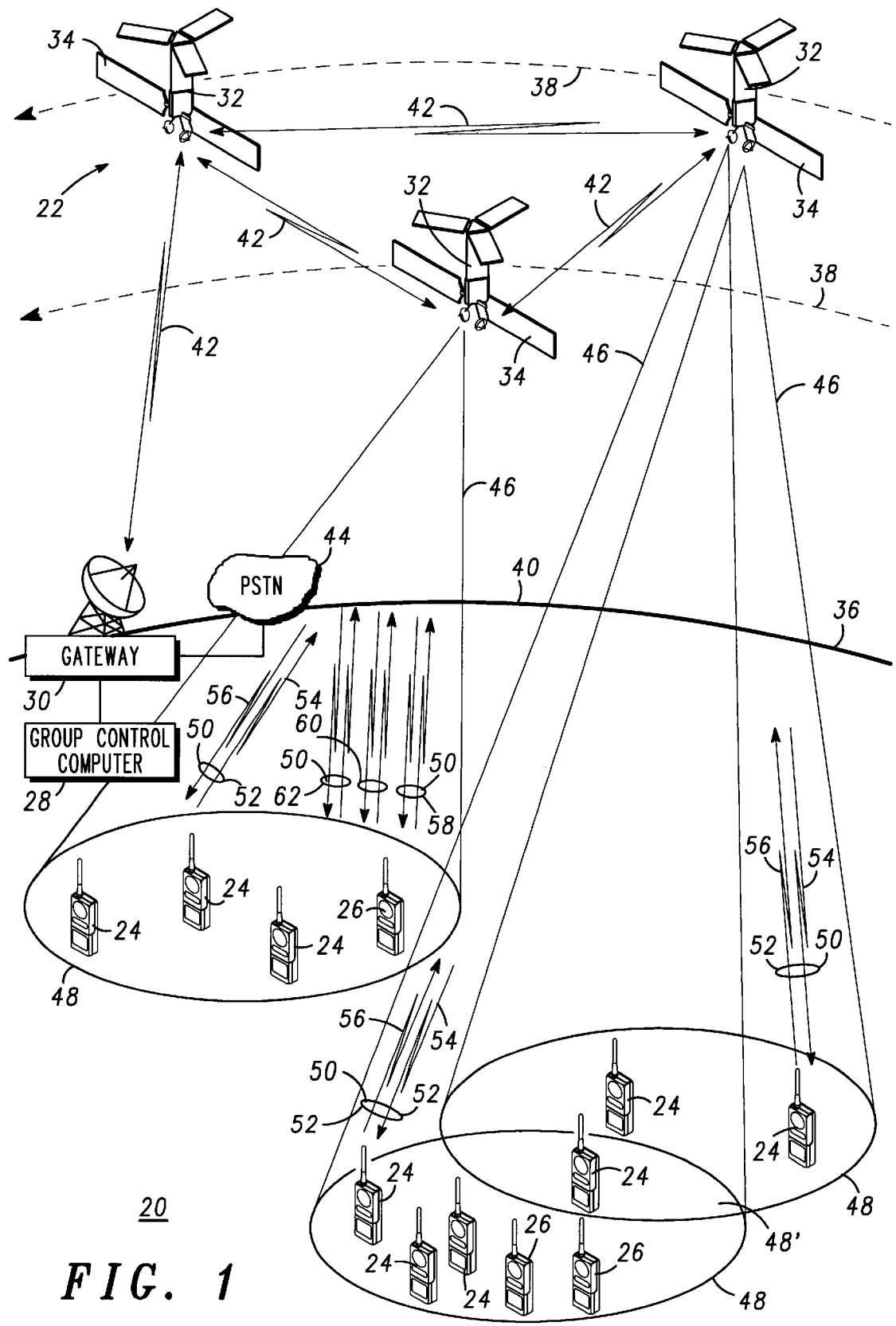
FIG. 1 shows a layout diagram of a group radio system configured in accordance with the teaching of the present invention.

FIG. 1 shows a layout diagram of a group radio communication system 20 configured in accordance with the teaching of the present invention. System 20 includes a cellular radio infrastructure 22, any number of subscriber radios 24 and 26, and a group control computer 28.

Cellular radio infrastructure 22 includes one or more gateways 30 (one shown) and any number of base stations 32. In the preferred embodiment, base stations 32 are implemented in a constellation of satellites 34 which orbit the Earth 36 in low earth orbits 38 so that they move at high speed relative to the surface 40 of the Earth. In one embodiment, satellites 34 may be similar or equivalent to satellites which provide commercially available telecommunication services under the trade name of IRIDIUM®. Base stations 32 are in communication with each other and with gateway 30 through various wide band RF cross links 42. In the preferred embodiment, group control computer 28 couples to gateway 30, at which point group control computer 28 has access to cellular radio infrastructure 22 and is in data communication with base stations 32. Group control computer 28 may be implemented using conventional computer technology, including, for example, a processor unit, a memory unit, a hard drive unit, I/O units, such as video display, keyboard and mouse, and an interface to gateway 30. In addition, the public switched telecommunications network 44 may access cellular radio infrastructure 22 at gateway 30.

Base stations 32 are configured to project antenna beams 46 toward the surface of the earth. FIG. 1 depicts only three of beams 46 for convenience, but each base station 32 may project numerous beams 46. Each beam 46 defines a radio coverage area or cell 48 on the surface of the Earth. A certain amount of overlap may occur between adjacent cells 48, as illustrated in cell overlap area 48'. Since satellites 34 within which base stations 32 are implemented move relative to the surface of the Earth, cells 48 likewise move relative to the surface of the Earth.

Cellular radio infrastructure 22, and more particularly base stations 32, communicate with subscriber radios 24 and 26 through various bi-directional channels 50. Channels 50 are implemented using one or more of FDMA, TDMA and CDMA channel division techniques. Accordingly, a specific channel 50 is defined by specifying a specific frequency allocation, time slot allocation, and/or spreading code. Subscriber radios 24 and 26 are slow moving relative to satellites 34 because they are terrestrially located by being used on or near the surface of the Earth. The relative movement of cells 48 and subscriber radios 24 and 26 causes subscriber radios 24 and 26 to switch channels 50 upon which they are operating from time to time as they find themselves in new cells 48. Moreover, subscriber radios 24 and 26 are operated to compensate for constant Doppler and propagation delay changes experienced in channels 50 due to this relative movement.

For purposes of the present discussion, subscriber radios 24 differ from subscriber radios 26 in that only subscriber radios 24 are members of a common group which participate in point-to-multipoint (PTM) communications. In other words, subscriber radios 24 or at least a portion of subscriber radios 24 function in a PTM radio group. In PTM communications, one subscriber radio 24 originates a transmission, referred to a monolog herein, which is broadcast to other subscriber radios 24 in the group. The originating subscriber radio 24 is called a monolog originator, and each of the other subscriber radios 24 to which the monolog is broadcast is a monolog target. The target of one monolog may originate a subsequent monolog.

Subscriber radios 26 may be configured similarly to PTM subscriber radios 24 except that subscriber radios 26 do not participate in the same point-to-multipoint group. They may participate in point-to-point (PTP) communications or in PTM communications for other groups. PTP communications refer to traditional telecommunication calls. As with traditional calls, a number is dialed, a call setup process is performed to allocate cellular radio infrastructure 22 resources to the call, and then the call commences. At the completion of the call; the resources are de-allocated so they may be re-used in a subsequent call. Nothing prevents PTM subscriber radios 24 from participating in PTP communications as well as PTM communications.

As depicted in FIG. 1, the collective radio coverage area for the group of PTM subscriber radios 24 may span several cells 48. Those cells 48 within which the PTM communications take place may be contiguously located and/or spaced apart. PTP communications may take place through cellular infrastructure 22 concurrently with PTM communications in the same vicinity. Desirably, cellular infrastructure 22 has a plurality of channels 50 at its disposal to use for PTP and PTM communications. This plurality of channels 50 is desirably reused where possible within the total radio coverage area of cellular radio infrastructure 22, which is substantially the entire surface of the Earth in the preferred embodiment.

Within a common beam 46, many PTM subscriber radios 24 engage in PTM communications using a single bi-directional multipoint channel 52. A different bi-directional multipoint channel 52 may be simultaneously used in different beams 46 to extend the coverage area for the group into multiple beams 46. The size of a group is not limited by available channels because all members of the group within a beam 46 share the beam's channel 52. Each multipoint channel 52 has a forward link 54 over which base station 32 transmits and a reverse link 56 over which subscriber radios 24 transmit. FIG. 1 depicts an ellipsis in reverse links 56 to indicate that subscriber radios 24 are controlled to modulate their transmission power level so that transmission occurs at a power level no greater than needed to achieve an adequate signal quality at the receiving base station 32. The modulation of power levels slows battery drain in subscriber radios 24 and reduces interference.

In contrast to shared bi-directional multipoint channel 52, PTP communications take place using a number of channels within the beam 46 where a PTP subscriber radio 26 is located. A bi-directional broadcast and access channel 58 is first used, then cellular infrastructure 22 instructs PTP subscriber radio 26 to operate on a bi-directional sync channel 60. After an exchange of messages between PTP subscriber radio 26 and cellular radio infrastructure 22 over channels 58 and 60, cellular infrastructure 22 allocates a bi-directional traffic channel 62 and instructs PTP subscriber radio 26 to operate on channel 62. FIG. 1 depicts an ellipsis in both forward and reverse links of traffic channel 62 to indicate that both PTP subscriber radio 26 and base station 32 are controlled to modulate their transmission power levels so that transmissions occur at power levels no greater than needed to achieve adequate signal quality at the receiving base station 32 and PTP subscriber radio 26.

Figure 2:
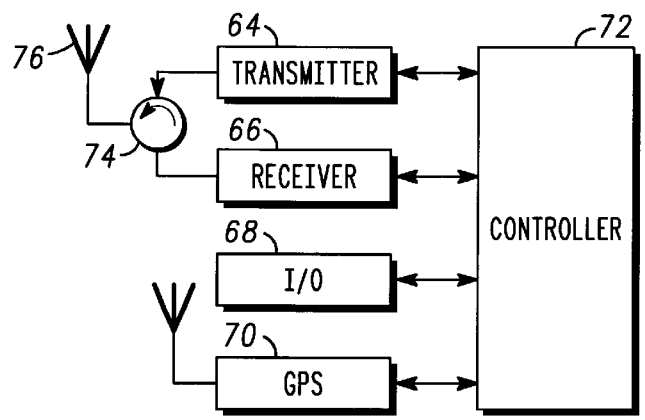
FIG. 2 shows a block diagram of a subscriber radio usable in the group radio system.

FIG. 2 shows a block diagram of hardware that may be used to implement subscriber radios 24 and 26. Subscriber radios 24 and 26 include a transmitter 64, receiver 66, input and output (I/O) section 68, an optional global position system receiver 70, and a controller 72. An output of transmitter 64 and an input of receiver 66 each couple to a circulator 74 (coupling network), which also couples to an antenna 76.

Controller 72 couples to transmitter 64, receiver 66, I/O section 68, and GPS receiver 70 both to transfer data and to provide control. For example, controller 72 provides data to transmitter 64 and influences the power level, frequency, timing, and/or coding at which transmitter 64 transmits over reverse links of channels 50 (FIG. 1). The data provided to transmitter 64 may be obtained through I/O section 68 and processed in controller 72, for example to vocode, encrypt, and/or apply error correction.

Likewise, controller 72 establishes the FDMA, TDMA and/or CDMA tuning applied to cause receiver 66 to listen on a specified forward link of a channel 50 (FIG. 1). Controller 72 also receives data from receiver 66 and passes such data to I/O section 68, possibly after processing in controller 72, for example to de-vocode, decrypt, and/or remove error correction. I/O section 68 includes any data port, microphone, loudspeaker, display, keypad, or other I/O device conventional in the art of computerized radio devices. GPS receiver 70 is controlled and provides geographical location data in a conventional manner to enable subscriber radios 24 and 26 to identify their current positions. GPS receiver 70 is an optional device which is desirable because it provides accurate location data. However, acceptable but less accurate location data may alternatively be obtained by processing signals received from satellites 34 (FIG. 1).

Figure 3:
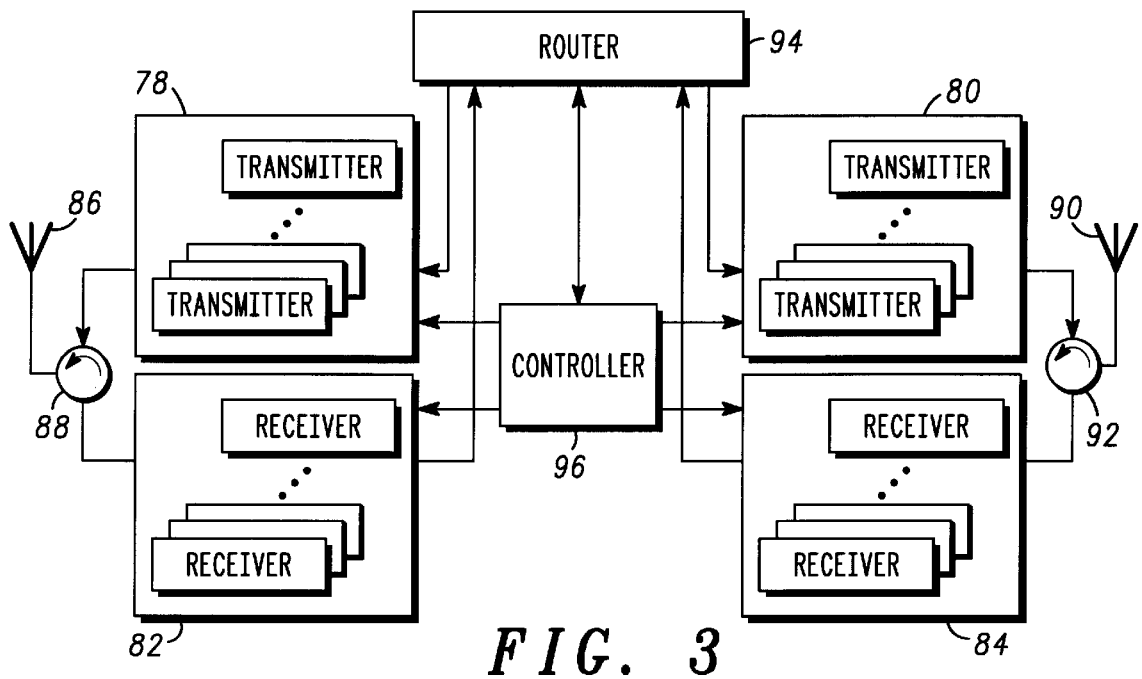
FIG. 3 shows a block diagram of a base station portion of the group radio system.

FIG. 3 shows a block diagram of a base station 32. Base station 32 includes transmitter blocks 78 and 80 and receiver blocks 82 and 84. Transmitter block 78 includes a plurality of individual transmitters that transmit over forward links in channels 50 for each beam 46 supported by base station 32. Receiver block 82 includes a plurality of individual receivers that receive over reverse links in channels 50 for each beam 46 supported by base station 32. The transmitters and receivers of blocks 78 and 82 may share one or more antennas 86 through a coupling network 88. Transmitter block 80 and receiver block 84 include individual transmitters and receivers, respectively, to transmit over cross links 42 (FIG. 1). The transmitters and receivers of blocks 80 and 84 may share one or more antennas 90 through a coupling network 92.

Each transmitter and each receiver of each block 78, 80, 82 and 84 couples to a router 94. A controller 96 couples to router 94 and to blocks 78, 80, 82, and 84. Data, preferably in the form of data packets, are received at receivers in blocks 82 and 84 and presented to router 94. Under the control of controller 96, these data packets are then switched to specified transmitters in transmitter blocks 78 and 80 for transmission out of base station 32. Accordingly, base station 32 performs a switching function as well as transmitting and receiving functions. Of course, certain control data packets received at a base station 32 may be addressed to base station 32 itself and are not routed. Such control data packets are consumed by the base station 32 to which they are addressed. They are consumed when the base stations 32 undertake the actions dictated by the control data packets.

Figure 4:
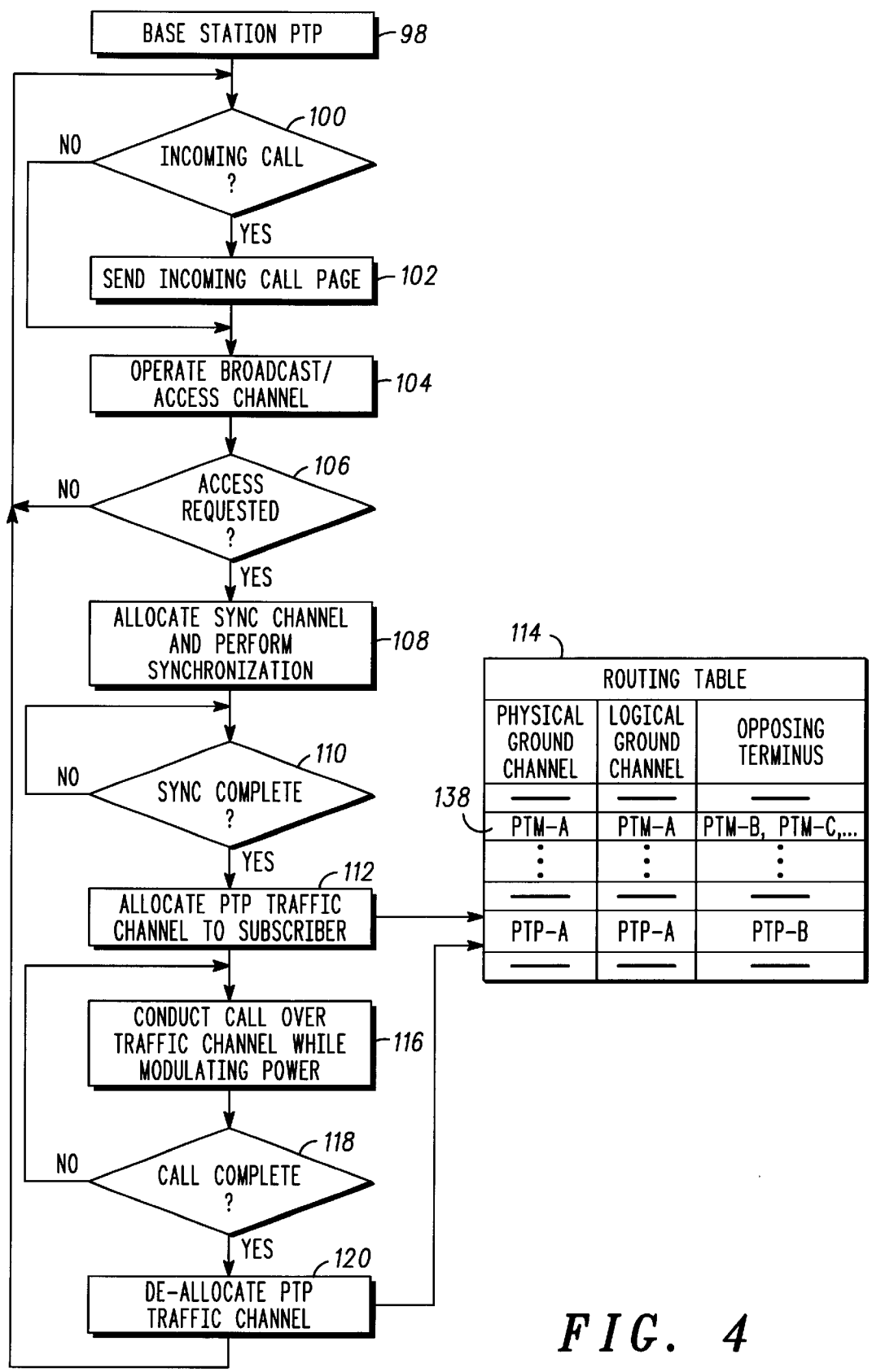
FIG. 4 shows a flow chart of a base station point-to-point (PTP) process performed by a base station to implement a PTP call.

FIG. 4 shows a flow chart of a base station point-to-point (PTP) process 98 performed by a base station 32 to implement a PTP call. In particular, process 98 is carried out by controller 96 (FIG. 3) of base station 32 in response to computer software stored in a memory portion (not shown) of controller 96 and executed by a processor portion (not shown) of controller 96. Each base station 32 in cellular radio infrastructure 22 may simultaneously execute processes similar to process 98. Moreover, each base station 32 may simultaneously execute numerous instances of process 98 to simultaneously handle numerous calls. While process 98 is concerned with a PTP call, it can be practiced while base station 32 is involved in a PTM communication session, as discussed in more detail below. Process 98 may be operated in conjunction with a PTP subscriber radio 26 (FIG. 1) performing conventional processes to originate or answer a PTP call.

Base station PTP process 98 includes a query task 100 which determines if an incoming call is being directed to a PTP subscriber radio 26 (FIG. 1) through cellular radio infrastructure 22 (FIG. 1). In particular, task 100 may determine if the identity of a PTP subscriber radio 26 to which an incoming call is being directed is listed as being registered with the base station 32 performing process 98. If task 100 determines that an incoming call is being directed to a PTP subscriber radio 26 within the jurisdiction of base station 32, then a task 102 causes a incoming call page message to be sent on a paging channel 50 (FIG. 1) that the PTP subscriber radio 26 may be listening to. After task 102 and when task 100 determines that no incoming call is being directed to a PTP subscriber radio 26, a task 104 is performed.

Task 104 operates broadcast and access channel 58 (FIG. 1) in accordance with predetermined protocols known to base station 32 and PTP subscriber radio 26. The forward link of channel 58 is monitored by any number of PTP subscriber radios 26 for system information, and the reverse link of channel 58 is used by any number of PTP subscriber radios 26 to request the allocation of cellular radio infrastructure 22 resources. Channel 58 may implement any of a variety of aloha, slotted aloha, or other random access techniques.

After, or in conjunction with, task 104, a query task 106 determines whether a PTP subscriber radio 26 is requesting access over the reverse link of channel 58. If no access is requested, then program flow loops back to task 100, where tasks 100, 104, 106, and possibly 102 are repeated. When task 106 detects a request for access, a task 108 is performed. The request for access detected in task 106 may answer an incoming call page message sent from base station 32 in a previous iteration of task 102, or it may represent a request to make an outgoing call from a PTP subscriber radio 26.

Task 108 allocates a bi-directional sync channel 60 (FIG. 1) for use by the access-requesting PTP subscriber radio 26 and then performs a synchronization routine. Sync channel 60 is allocated by base station 32 transmitting the identity of sync channel 60 in association with the identity of PTP subscriber radio 26 over the forward link of broadcast and access channel 58 (FIG. 1), and by PTP subscriber radio 26 tuning to the indicated sync channel 60. During synchronization, the base station 32 and PTP subscriber radio 26 exchange a series of messages over sync channel 60 while PTP subscriber radio 26 adjusts transmission parameters, such as power level, carrier frequency, and time slot timing, so that the transmissions of PTP subscriber radio 26 adequately compensate for Doppler and propagation delay and meet the reception standards of base station 32. Sync channel 60 is used for synchronization rather than broadcast and access channel 58 so that broadcast and access channel 58 will remain available for use by other PTP subscriber radios 26.

In conjunction with task 108, a query task 110 determines whether synchronization is complete. FIG. 4 indicates that program control does not progress beyond task 110 until synchronization is deemed complete, but error detection tasks (not shown) are also included to prevent program control from remaining at query task 110 indefinitely. Upon completion of task 110, a call setup process for the upcoming PTP call begins.

The call setup process includes a task 112 which allocates bi-directional traffic channel 62 (FIG. 1) exclusively to the PTP subscriber radio 26. Traffic channel 62 is selected from a pool of channels 50 which are deemed to be available at the instant task 112 is performed. Channels 50 are available if not otherwise in use and if they are predicted not to cause undue interference with other channels 50 currently in use in the vicinity.

As illustrated in a routing table 114, task 112 allocates traffic channel 62 by associating the allocated traffic channel 62 with other allocated channels 50, by making an association between physical and logical identities of the channel 62, and by making an association between the traffic channel 62 and a logical identity for the opposing terminus of the call. In addition, the identity of the physical allocated traffic channel is sent to the PTP subscriber radio 26, whereupon the PTP subscriber radio 26 tunes its subsequent operations to the traffic channel 62.

After task 112, a task 116 is performed to conduct the PTP call over the traffic channel 62 allocated above in task 112. The PTP call involves PTP subscriber radio 26 and base station 32. Traffic channel 62 remains allocated throughout the duration of the call. Incoming packets to base station 32 addressed to the logical ground channel allocated to the call are routed to and transmitted over the physical traffic channel 62. Likewise incoming packets to base station 32 from the physical traffic channel 62 are routed toward the logical address of the opposing terminus.

During the call, traffic channel 62 is maintained using in-band signaling. PTP subscriber radio 26 sends feedback information to base station 32 to control or modulate the power level at which base station 32 transmits over traffic channel 62. Likewise, base station 32 sends feedback information to PTP subscriber radio 26 which controls or modulates transmission parameters of PTP subscriber radio 26. In particular, link maintenance data cause PTP subscriber radio 26 to modulate its transmission power, transmission carrier frequency, and time slot timing as needed so power levels are no greater than necessary and so the reception standards of base station 32 are followed in spite of changing Doppler and propagation delay.

In conjunction with task 116, a query task 118 determines if the call is complete. Task 118 may make its determination based at least in part upon the receipt or non-receipt of signaling which conveys an on-hook message from either terminus of the call. So long as the call is not yet complete, program control loops back to task 116. When task 118 determines that the call is complete, a task 120 de-allocates PTP traffic channel 62 so that it may be re-allocated for use in another call. Traffic channel 62 may be de-allocated by instructing PTP subscriber radio 26 to cease operations on traffic channel 62 and by removing the associations established in routing table 114 for the call. After task 120, program flow loops back to task 100 to repeat process 98.

Figure 5:
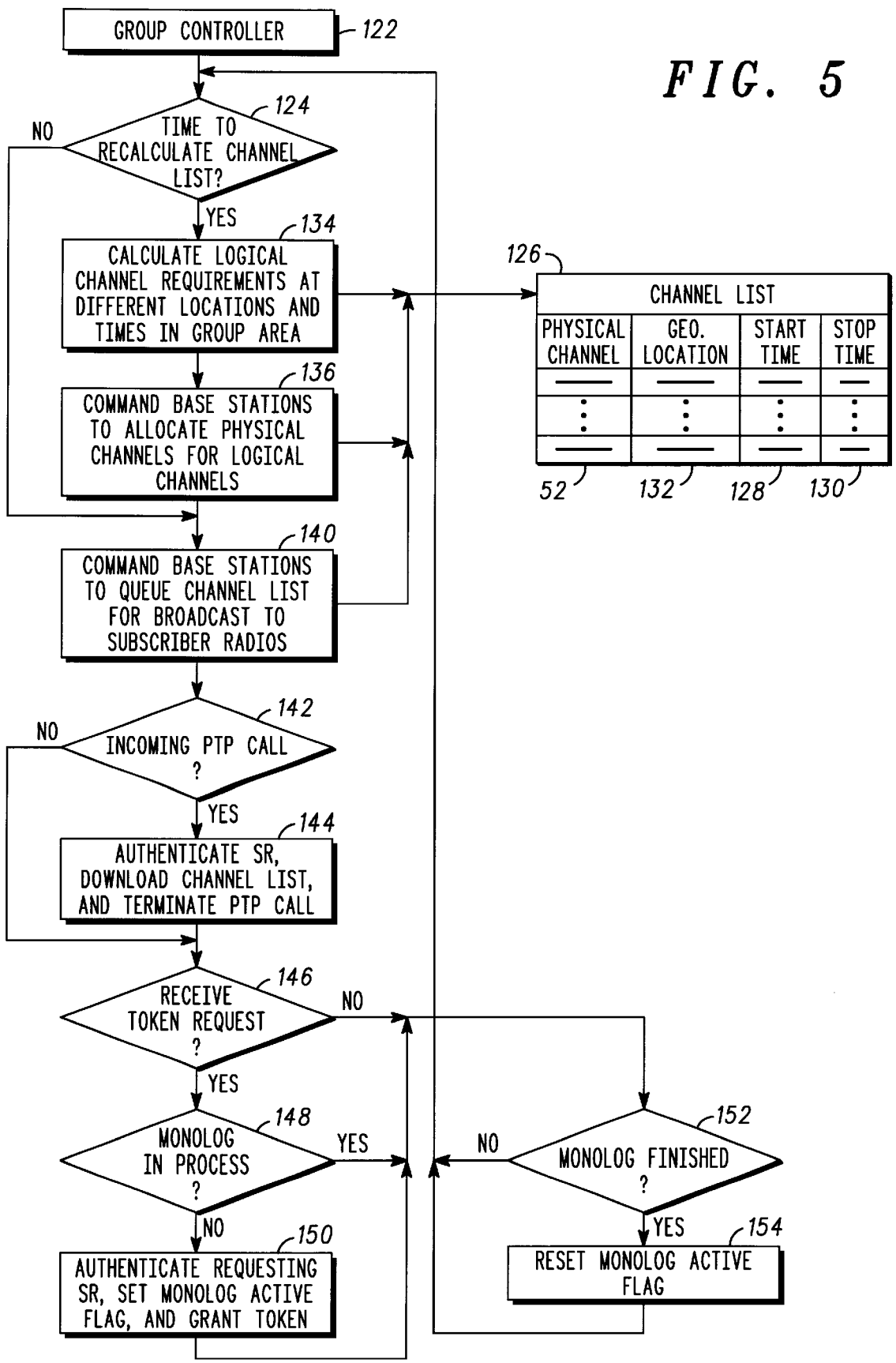
FIG. 5 shows a flow chart of a group controller process performed by a group control computer portion of the group radio system.

FIG. 5 shows a flow chart of a group controller process 122 performed by group control computer 28 (FIG. 1). Process 122 is carried out in response to computer software stored in group control computer 28 to manage a group or PTM communication session. Process 122 may be simultaneously performed any number of times to manage any number of groups. The group communication session may last for any length of time, from a few minutes to perennially, but in a typical scenario continues at least for several hours. While not a requirement of the present invention, it is expected that a group will include PTM subscriber radios 24 that are located near one another or that are located in spaced apart clusters. In the typical scenario, the area covered by a group will be a subset of the entire radio coverage area of cellular radio infrastructure 22 (FIG. 1). Accordingly, cells 48 (FIG. 1) will move into and out of the group coverage as satellites 34 (FIG. 1) move in their orbits 38 (FIG. 1).

Group controller process 122 includes a query task 124 which determines whether a schedule (not shown) indicates that now is the time to recalculate a channel list 126. Channel list 126 indicates bi-directional multipoint channels 52 (FIG. 1) that have been or will be allocated to a PTM communication session for the group of interest. List 126 identifies a subset of all bi-directional channels 50 (FIG. 1) used by cellular radio infrastructure 22. While more channels may be allocated, only one channel 52 for each beam 46 (FIG. 1) that covers a portion of the group coverage area is needed. If multiple beams 46 cover the group coverage area, channel list 126 lists multiple beams.

Since multipoint channels 52 move over the group coverage area, each channel has a timing window of activation associated with it in channel list 126. In other words, channel list 126 associates with each multipoint channel 52 a start time 128 and stop time 130, a start time and a duration (not shown), or the like, and a geographical location 132 to indicate when a given multipoint channel 52 is active in a specified location within the group coverage area.

Desirably, channel list 126 includes many entries, with several entries for each active multipoint channel 52 at different locations and times, different multipoint channels 52 identified for widely dispersed locations covered by different beams 46 at a common time, and different channels 52 identified for nearby locations at different times. Of course, different multipoint channels 52 concurrently activated in different beams 46 are not required unless the group coverage area is so large that multiple beams 46 are required to cover it. The use of several such entries in channel list 126 permits PTM subscriber radios 24 to interpolate between the entries to determine which multipoint channels 52 are predicted to provide the best signal quality for a given geographical location and time.

Group controller process 122 desirably calculates channel list 126 for a considerable duration, e.g., several hours, into the future. Periodically-channel list 126 is recalculated so that channel list 126 tracks the upcoming dynamics of the constellation of satellites 34 and of multipoint channels 52 relative to a group coverage area of interest. When task 124 determines that channel list 126 needs to be recalculated, a task 134 is performed.

Task 134 desirably calculates logical channel requirements at a variety of times and locations within the group coverage area. In other words, task 134 calculates numerous entries for channel list 126, except that actual physical channel identities are not associated with the logical channels at task 134. Task 134 may be performed in response to a priori ephemeris data concerning the constellation of satellites 34, antenna pattern data for antennas 86 (FIG. 3) of base stations 32, and well known orbital geometric calculations.

Following task 134, a task 136 commands base stations 32 to allocate physical channels to the logical channels identified above in task 134. The commands are issued to base stations 32 through data packets addressed to the base stations 32 and delivered through cellular radio infrastructure 22. The physical channels are allocated in base stations 32 by making appropriate entries 138 in respective routing tables 114 (FIG. 4).

As illustrated in table 114 (FIG. 4), the allocation of multipoint channels 52 causes a physical to logical association to occur for the affected base station 32 as well as an association with all logical multipoint channels 52 then-currently active in other base stations 32. The allocation of physical multipoint channels 52 will prevent the allocated multipoint channels 52 from being used for other purposes, such as conducting PTP calls, by cellular radio infrastructure 22. However, the mere allocation of physical multipoint channels 52 in routing table 114, without other allocation activities such as using the channels, does not cause base stations 32 or subscriber radios 24 to consume power because no transmissions or link maintenance occurs from the mere allocation of physical multipoint channels 52 in routing table 114.

The allocation of physical multipoint channels 52 may occur far in advance of when needed, or may simply be scheduled at task 136 to occur in a background mode (not shown) on an as-needed basis. In response to the commands of task 136, base stations 32 return data messages to group control computer 28 which identify the physical multipoint channels 52 associated with logical channels, and task 136 enters the physical multipoint channel 52 identities in channel list 126.

Following task 136 and when task 124 determines it is not time to recalculate channel list 126, a task 140 is performed. Task 140 commands selected base stations 32 to queue channel list 126 for broadcast to PTM subscriber radios 24. As a result of task 140 and of base stations 32 broadcasting channel list 126, PTM subscriber radios 24 listen to a stream of data, as discussed in more detail below, which allows the PTM subscriber radios 24 to maintain their own channel lists 126 in a current condition and to select the appropriate channels on which to operate in order to participate in the PTM communication session.

FIG. 5 depicts a query task 142 following task 140. Task 142 determines whether an incoming PTP call is being placed to group control computer 28. If an incoming call is detected, a task 144 answers the call, authenticates the caller as a bone fide PTM subscriber radio (SR) 24, downloads the current channel list 126 to the authenticated PTM subscriber radio 24, and terminates the PTP call. Through the operation of tasks 142 and 144, a PTM subscriber radio 24 can quickly obtain a valid channel list 126 when needed, such as upon power-up or after an anomalous event causes a currently held channel list 126 to appear stale or otherwise invalid, so that the PTM subscriber radio 24 can then participate in a PTM communication session. However, for PTM subscriber radios 24 already participating in a PTM communication session, the stream of channel list 126 data delivered as a result of task 140 keeps their locally held channel lists 126 current.

Following tasks 142 and 144, a query task 146 determines whether group control computer 28 has recently received a token request. A token is a intangible construct used to manage a PTM communication session. In general, it represents the permission to originate a monolog. In the preferred embodiment, only one PTM subscriber radio 24 may originate a monolog at a time. If the token is not currently granted, i.e., if no monolog is active, then any PTM subscriber radio 24, in the usual mode of operation, may request and be granted a token. However, if the token has been granted to a PTM subscriber radio 24, i.e. that PTM subscriber radio 24 is originating a monolog, then the token cannot be issued to another PTM subscriber radio 24 until released by that originating PTM subscriber radio 24. The request for a token is routed to group control computer 28 through signaling when, for example, a subscriber pushes a push-to-talk (PTT) button in I/O section 68 (FIG. 2) on the subscriber's PTM subscriber radio 24. A granted token may be released when the subscriber releases the PTT button.

When task 146 discovers a token request, a task 148 is performed to determine whether a monolog is currently in progress. Task 148 may make its determination by examining a monolog active flag (not shown) maintained within group controller process 122 to indicate the status of a monolog. If no monolog is currently in progress, then a task 150 authenticates the requesting PTM subscriber radio 24, sets the monolog active flag, and grants the token by signaling the base station 32 and PTM subscriber radio 24 involved that the monolog may commence.

After task 150 and when task 146 fails to detect a request for the token, a task 152 determines whether any monolog which may have been ongoing has now finished. The completion of a monolog may be detected by signaling messages directed to group control computer 28 and indicating intentional release of the token. Likewise, error detection tasks (not shown) may be included to automatically end a monolog when an excessive amount of time is spent originating a monolog. In one embodiment, group control computer 28 includes its own address in commands to allocate multipoint channels 52 in base stations 32 so that monolog packets will be delivered to group control computer 28 as well as to the group PTM subscriber radios 24. In this embodiment, group control computer 28 monitors monolog packets, and when an excessive period of silence is encountered the monolog is automatically declared finished.

Unless a monolog is declared to be finished by task 152, program flow proceeds back to task 124 so that group controller process 122 continuously repeats its various tasks. When task 152 determines that a monolog has finished, a task 154 is performed to reset the monolog active flag, which will allow task 148 to issue the token to a subsequent requester. After task 154, program flow proceeds back to task 124 so that group controller process 122 continuously repeats its various tasks.

Figure 6:
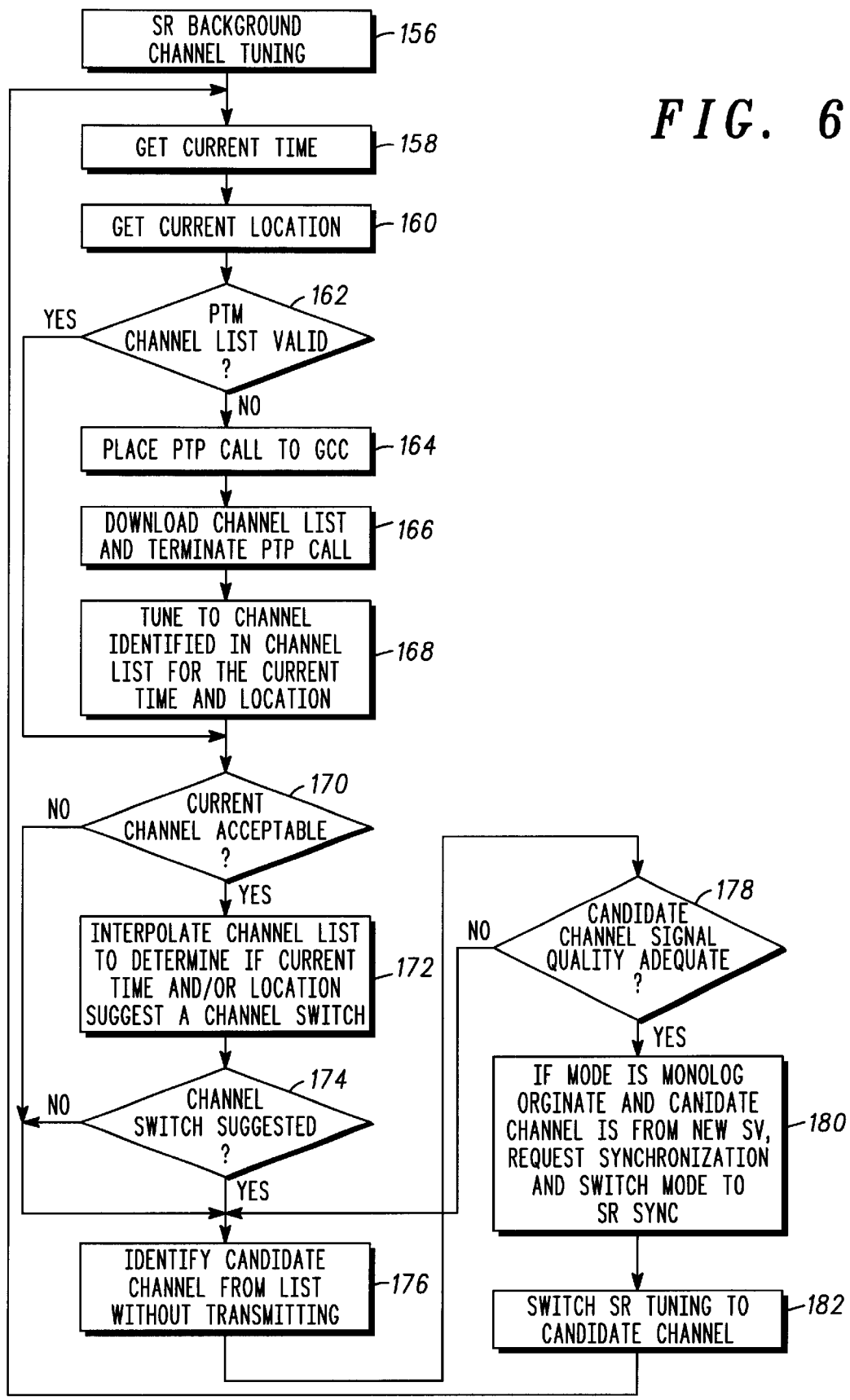
FIG. 6 shows a flow chart of a subscriber radio (SR) background channel tuning process performed by the subscriber radio of FIG. 2.

FIG. 6 shows a flow chart of a subscriber radio (SR) background channel tuning process 156 performed by each PTM subscriber radio 24. Process 156 is carried out in response to computer software stored in a memory portion (not shown) of controller 72 (FIG. 2) and executed by a processor portion (not shown) of controller 72. Each PTM subscriber radio 24 participating in a common group may simultaneously execute processes similar to process 156. In addition, other processes including a subscriber radio PTM foreground process discussed below, are carried out concurrently with process 156. In general, process 156 allows PTM subscriber radio 24 to continuously operate upon the appropriate bi-directional multipoint channel 52 (FIG. 1) for the current location and time without requiring the PTM subscriber radio 24 to send messages to cellular radio infrastructure 22.

Process 156 includes a task 158 which gets the current time. In the preferred embodiment, all PTM subscriber radios 24 participating in a PTM communication session monitor a multipoint channel 52 selected to be appropriate for their current location and time. Time stamps are routinely transmitted over this multipoint channel 52. Using an internal timer portion (not shown) of controller 72 (FIG. 2) and these time stamps, PTM subscriber radio 24 maintains a clock synchronized to the time base of cellular radio infrastructure 22.

Next, a task 160 gets the current geographical location for PTM subscriber radio 24. The current location is preferably obtained from the operation of GPS receiver 70 (FIG. 2) so that location data is relatively accurate. However, in an alternate embodiment acceptably accurate data may be obtained by monitoring signals broadcast from base stations 32 in orbiting satellites 34 over multipoint channels 52 or other channels 50.

After task 160, a query task 162 determines whether the subscriber radio's local PTM channel list 126 (FIG. 5) is valid. Task 162 may conclude that the list is valid if the current location and time appear to fall within the times and locations indicated within the local channel list 126. If task 162 determines that channel list 126 is not valid, then a task 164 places a PTP call to group control computer 28 (FIG. 1) through cellular radio infrastructure 22, and a task 166 downloads a current version of channel list 126 and terminates the PTP call. Following task 166, a task 168 tunes PTM subscriber radio 24 to the bi-directional multipoint channel 52 identified in the recently downloaded channel list 126 for the current time and location of PTM subscriber radio 24, as determined above in tasks 158 and 160.

After task 168 and when task 162 determines that the local channel list 126 was valid, a query task 170 determines whether the currently selected multipoint channel 52 upon which PTM subscriber radio 24 is operating is acceptable. Acceptability is desirably determined merely by listening to the currently selected multipoint channel 52. If acceptable signal quality is indicated, then a task 172 is performed.

Task 172 interpolates the local channel list 126 to determine if the current location and time, as determined in a recent iteration of tasks 158 and 160, suggest that a channel switch would be advantageous. Task 172 may interpolate the entries of channel list 126 to construct an interpolated entry that is as near as possible to the current location for the current time.

If, as a result of the interpolation of task 172, another multipoint channel 52 appears to be coming available for the current time and location, then a switch is suggested even though the currently selected multipoint channel 52 may be providing acceptable signal quality. Alternatively, if the currently selected multipoint channel 52 appears to soon be inactive at the current location, then a switch is suggested regardless of the signal quality of the currently selected multipoint signal 52. In other words, the investigation in task 172 takes place independently of the signal quality currently demonstrated by the currently selected multipoint channel 52. A query task 174 determines whether the channel switch is suggested, and if no suggestion is found, program flow loops back to task 158 to continuously perform process 156.

When task 174 finds a suggestion for switching multipoint channels 52 and when task 170 determines that the currently suggested channel is no longer acceptable, a query task 176 identifies a best candidate multipoint channel 52 from the local channel list, based upon the current time and location. No transmission is emitted from PTM subscriber radio 24 in making the identification in task 176.

By refraining from transmitting at task 176, a considerable power consumption saving results. PTM subscriber radios 24 may participate in PTM communication sessions for extended durations without draining batteries. In addition, a large number of PTM subscriber radios 24 may operate on the same common bi-directional multipoint channel 52 without interfering. Reverse link 56 (FIG. 1) bandwidth, spectrum, or time in multipoint channel 52 need not be consumed in making individual channel selections for individual PTM subscriber radios 24 because individual PTM subscriber radios 24 make their own channel selections. Accordingly, radio communication system 20 (FIG. 1) is scalable to virtually any number of PTM subscriber radios 24 which can operate using as few as a single multipoint channel 52 per beam 46 (FIG. 1) over the group coverage area. Reverse link 56 may be reserved for use in delivering a monolog. The scarce commodity of channels 50 (FIG. 1) need not be used to perform the function of channel switching.

After task 176, a query task 178 verifies whether the candidate channel identified in task 176 exhibits adequate signal quality. The verification of task 178 is performed independently of the signal quality of the currently selected multipoint channel 52. The verification of task 178 merely determines whether the quality of the candidate multipoint channel 52 is adequate to support communications. Task 178 may briefly listen to a pilot channel associated in the same beam 46 where the candidate multipoint channel 52 resides to make a quick determination. This is accomplished by temporarily tuning receiver 66 (FIG. 2) to the candidate multipoint channel 52 or associated pilot beam. Desirably, a very low percentage of time is spent performing the verification in task 178, using the candidate multipoint channel 52 or associated pilot beam, so that the amount of time spent listening to the currently selected multipoint channel 52 is as large as possible. If task 178 determines that the candidate channel signal quality is not acceptable, program flow loops back to task 176 to identify another candidate multipoint channel 52 if possible. Of course, error detection tasks (not shown) may be included so that program flow does not remain at tasks 176 and 178 indefinitely. Again, no transmission is emitted from PTM subscriber radio 24.

When task 178 finds acceptable quality on a candidate multipoint channel 52, a task 180 is performed. Task 180 becomes relevant when the candidate multipoint channel 52 is in a beam 46 supported by a different satellite (SV) 34 and if the PTM subscriber radio 24 is in the monolog originate mode at the time task 180 is performed. In this situation, the Doppler and propagation delay offsets currently being used by PTM subscriber radio 24 will be incorrect for operation on the candidate multipoint channel 52, and synchronization is performed before operation may commence on the candidate multipoint channel 52.

Following task 180, a task 182 is performed to switch the tuning of PTM subscriber radio 24 to the candidate channel. As a result of task 182, the candidate channel becomes the currently selected channel, discussed above. After task 182, program flow loops back to task 158 to continuously repeat process 156 to track the relative movement between PTM subscriber radio 24 and cells 48 (FIG. 1).

Accordingly, process 156 accomplishes channel selection in PTM subscriber radios 24 without requiring PTM subscriber radios 24 to emit a transmission for the purpose of operating on a new multipoint channel 52, thereby conserving spectrum and power. Moreover, channel selection is accomplished in a manner that improves reliability by reducing the deleterious effects of drop-outs and quickly fading channels. In the normal situation, multipoint channel switching takes place as soon as upcoming multipoint channels 52 provide adequate quality, reducing the likelihood of existing multipoint channels 52 fading too quickly to select a new channel. In other words, PTM subscriber radios 24 predict and switch to candidate multipoint channels 52 before the current multipoint channels 52 have a chance to fade out. In addition, channel list 126 is configured with time and location data so that PTM subscriber radios 24 can accurately predict correct candidate multipoint channels 52. This frees PTM subscriber radios 24 from spending a significant amount of receiver 66 (FIG. 2) time scanning for candidate channels and increases the time spent listening to the selected multipoint channel 52.

Figure 7:
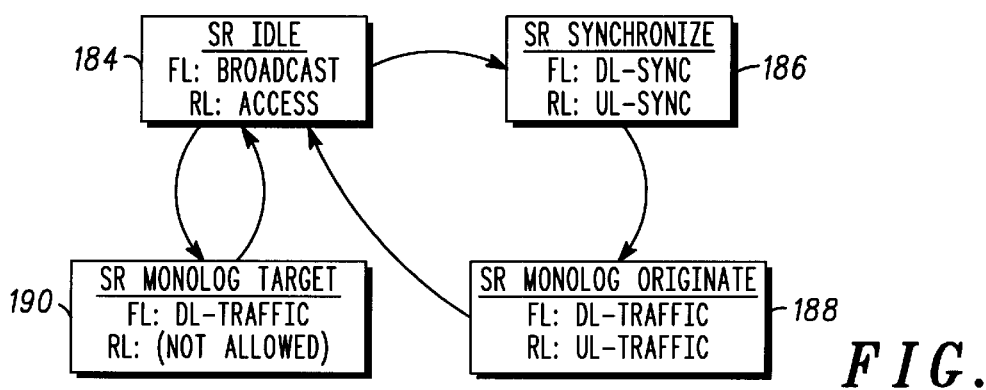
FIG. 7 shows a state diagram which depicts various states in which a bi-directional multipoint radio channel is operated in accordance with the group radio system of FIG. 1.

FIG. 7 shows a state diagram which depicts various states in which a bi-directional multipoint channel 52 is operated in accordance with the radio communication system 20 (FIG. 1) so that it is shared among many PTM subscriber radios 24. In particular, FIG. 7 depicts states from the perspective of a PTM subscriber radio 24.

A subscriber radio (SR) idle state 184 is the mode of operation where no monolog is being originated. In this state, all PTM subscriber radios 24 in the group are listening to their multipoint channels 52. In particular, PTM subscriber radios 24 listen to forward link (FL) 54 (FIG. 1) of multipoint channel 52. In idle state 184 forward link 54 is operated in accordance with a broadcast protocol. In the broadcast protocol, base station 32 transmits system data, such as a channel list from which PTM subscriber radio 24 may select an appropriate multipoint channel 52, and time stamps. In addition, signaling information, such as group ID, and indications of whether or not a monolog has been recently requested or is ongoing may be transmitted.

In idle state 184, reverse link (RL) 56 (FIG. 1) of multipoint channel 52 is operated in accordance with an access protocol. In accordance with the access protocol, a PTM subscriber radio 24 transmits only when it wishes to be granted permission to originate a monolog. Since reverse link 56 can be available to many PTM subscriber radios 24, a suitable random accessing technique is desirably adopted for reverse link 56 of multipoint channel 52. During access, PTM subscriber radio 24 has not yet adjusted its transmission parameters to acquire the reception standards of base station 32. Accordingly, the access protocol may communicate data much more slowly than the broadcast protocol so that some degree of reception can occur in spite of the lack of synchronization.

When a PTM subscriber radio 24 wishes to originate a monolog, the same multipoint channel 52 transitions to an SR synchronize state 186 for the one PTM subscriber radio 24. During synchronize state 186, forward link 54 is operated in accordance with a down link (DL) synchronization (sync) protocol and reverse link 56 is operated in accordance with an up link (UL) sync protocol. In accordance with the UL sync protocol, PTM subscriber radio 24 transmits data at a relatively slow data rate and/or baud while base station 32 receives the data and reciprocates with the transmission of data at a relatively fast data rate and/or baud in accordance with the DL sync protocol. PTM subscriber radio 24 uses the data from forward link 54 to adjust transmission parameters, such as power level, carrier frequency, and time slot timing, for subsequent transmissions over reverse link 56. Synchronization state 186 continues until base station 32 determines that PTM subscriber radio 24 is transmitting using suitable transmission parameters which permit a faster baud communication.

Upon the completion of synchronization state 186, multipoint channel 52 transitions to an SR monolog originate state 188 for the one originating PTM subscriber radio 24. In state 188, forward link 54 operates in accordance with a DL-traffic protocol in which data packets containing monolog data are transmitted from base station 32 at a fast baud, and reverse link 56 operates in accordance with a UL-traffic protocol in which packets containing monolog data are transmitted from the originating PTM subscriber radio 24 at a fast baud to its serving base station 32. An originating PTM subscriber radio 24 listens to forward link 54 primarily for an in-band signaling channel or field included in the DL-traffic protocol. This in-band signaling channel conveys data used by the originating PTM subscriber radio 24 to adjust transmission parameters. Upon the completion of SR monolog originate state 188, multipoint channel 52 transitions back to idle state 184.

For the many target PTM subscriber radios 24 that receive a monolog, the same multipoint channel 52 transitions from idle state 184 to an SR monolog target state 190 when a monolog originates elsewhere. State 190 uses the DL-traffic protocol for multipoint channel 52, as discussed above in connection with state 188. However, in monolog target state 190, PTM subscriber radios 24 are primarily interested in monolog data packets transmitted from base station 32 rather than in-band signaling. Moreover, in monolog target state 190, no transmissions are allowed over reverse link 56 because such transmissions would cause interference with any monolog being originated using the same multipoint channel 52. Upon the completion of the monolog, the state of this multipoint channel 52 transitions back to idle state 184.

Figure 8:
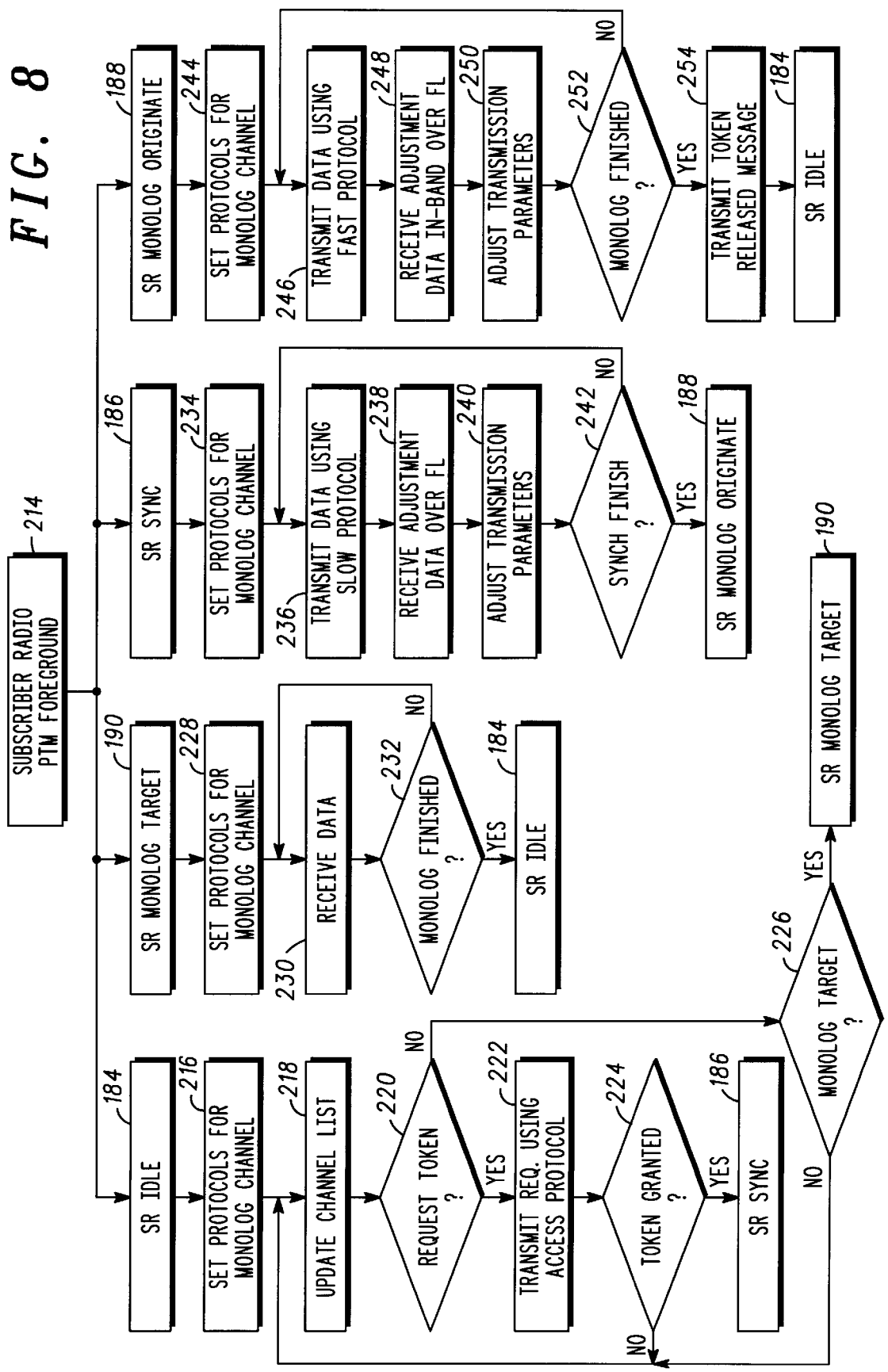
FIG. 8 shows a flow chart of a subscriber radio point-to-multipoint (PTM) foreground process performed by a subscriber radio to support the state diagram of FIG. 7.

FIG. 8 shows a flow chart of a subscriber radio PTM foreground process 214 performed by PTM subscriber radios 24 to support and implement the state diagram of FIG. 7. FIG. 8 illustrates process 214 operating in four modes corresponding to states 184, 186, 188, and 190, discussed above.

Process 214, when operating in idle state 184, performs a task 216 to set the protocols upon which forward link 54 and reverse link 56 of multipoint channel 52 operate during idle state 184. In particular, the broadcast protocol is set for forward link 54 and the access protocol is set for reverse link 56. After task 216, a task 218 updates a local channel list being maintained in PTM subscriber radio 24. The local channel list presents a selection of multipoint channels 52 along with timing and geographical location data indicating when and where the multipoint channels are or will be active. The local channel list is conveyed over forward link 54 in accordance with the broadcast protocol.

Following task 218, a query task 220 is performed to determine whether a token is being requested. A token is requested when a PTM subscriber radio 24 wishes to originate a monolog. Task 220 may make its determination by determining whether a push-to-talk button in I/O section 68 (FIG. 2) of PTM subscriber radio 24 has been pushed. If a token is being requested, then a task 222 transmits a message to the serving base station 32 of cellular radio infrastructure 22 over reverse link 56 using the access protocol. Following task 222, a query task 224 is performed to determine whether the token request was granted. In other words, task 224 determines whether group control computer 28 (FIG. 1) has granted permission for this PTM subscriber radio 24 to originate a monolog. Task 224 may make its determination by monitoring multipoint channel 52 operating in accordance with the broadcast protocol for a message directed to this PTM subscriber radio 24 indicating a grant of the token. If the token is not granted, then program flow loops back to task 218, causing process 214 to remain in idle state 184.

When a token grant is detected at task 224, process 214 proceeds to sync state 186. In proceeding to sync state 186, PTM subscriber radio 24 may transmit a message to the serving base station 32 commanding that base station 32 to transition to sync state 186 as well.

When task 220 in idle state 184 fails to detect a request for the token, a query task 226 determines whether process 214 should transition to monolog target state 190. Task 226 may make its determination by monitoring signaling conveyed in forward link 54 in accordance with the broadcast protocol. If no need to transition to monolog target state 190 is detected, program control flows back to task 218 and process 214 continues to operate in idle state 184.

If a need to transition to monolog target state 190 is detected, process 214 performs a task 228 to set the protocols upon which forward link 54 and reverse link 56 of the multipoint channel 52 operate during SR monolog target state 190. In particular, the protocol for forward link 54 is set to the DL-traffic protocol and the protocol for reverse link 56 is disabled or otherwise set to disable transmission from PTM subscriber radio 24.

Following task 228, a task 230 is performed to receive data over forward link 54 of the multipoint channel 52 in accordance with the DL-traffic protocol. Much of any in-band signaling conveyed in accordance with DL-traffic protocol may be ignored because it is directed to an originating PTM subscriber radio 24. The conveyed data is relevant and processed as needed before being passed on to the subscriber through I/O section 68 (FIG. 2).

In connection with task 230, a query task 232 determines whether the monolog has finished. Completion of a monolog may be determined by monitoring the in-band signaling channel of the DL-traffic protocol for one of the few items of signaling which might apply to a target PTM subscriber radio 24, and which signals an end to the monolog. If task 232 determines that a monolog is not yet finished, program control loops back to task 230 to continue receiving data. Of course, error handling tasks (not shown) may be included to insure that process 214 does not remain at tasks 230 and 232 indefinitely. When task 232 detects the end of the monolog, process 214 returns to idle state 184.

Process 214, when operating in sync state 186, performs a task 234 to set the protocols upon which forward link 54 and reverse link 56 of the multipoint channel 52 operate during sync state 186. In particular, the protocol for forward link 54 is set to the DL-sync protocol and the protocol for reverse link 56 is set to the UL-sync protocol.

Next, a task 236 causes data to be transmitted over reverse link 56 using the slow baud, UL-sync protocol. Following task 236, a task 238 receives transmitter adjustment data over forward link 54 in accordance with the relatively faster DL-sync protocol. In response to the data received in task 238, a task 240 adjusts transmission parameters, such as power level, carrier frequency, and time slot timing, as indicated in the adjustment data. Then, a query task 242 determines whether the sync mode of operation is finished. The sync mode of operation is finished when the serving base station 32 sends and this PTM subscriber radio 24 receives a message indicating that sync is complete. If task 242 does not detect completion of the sync mode of operation, program control loops back to task 236 to continue operation in sync state 186. When the sync mode of operation is finished, program control proceeds to SR monolog originate state 188.

Process 214, when operating in monolog originate state 188, performs a task 244 to set the protocols upon which forward link 54 and reverse link 56 of multipoint channel 52 operate during monolog originate state 188. In particular, the protocol for forward link 54 is set to the DL-traffic protocol and the protocol for reverse link 56 is set to the UL-traffic protocol.

After task 244, a task 246 transmits data over reverse link 56 using the relatively fast baud UL-traffic protocol compared to the access and sync protocols. Following task 246, a task 248 receives transmitter adjustment data over forward link 54 in accordance with the in-band signaling provisions of the DL-traffic protocol. In response to the data received in task 248, a task 250 adjusts transmission parameters, such as power level, carrier frequency, and time slot timing, as indicated in the adjustment data. Then, a query task 252 determines whether the monolog originate mode of operation is finished. The monolog originate mode of operation is finished when the subscriber indicates its completion, such as by releasing a push-to-talk button of I/O section 68 (FIG. 2). If task 252 does not detect completion of the sync mode of operation, program control loops back to task 246 to continue operation in monolog originate state 188. When the monolog originate mode of operation is finished, a task 254 causes a token release message to be transmitted over reverse link 56, whereupon group control computer 28 and/or components of cellular radio infrastructure 22 cause the token release message to be conveyed to other PTM subscriber radios 24 in the group. Following task 254, program control returns to idle state 184.

Figure 9:
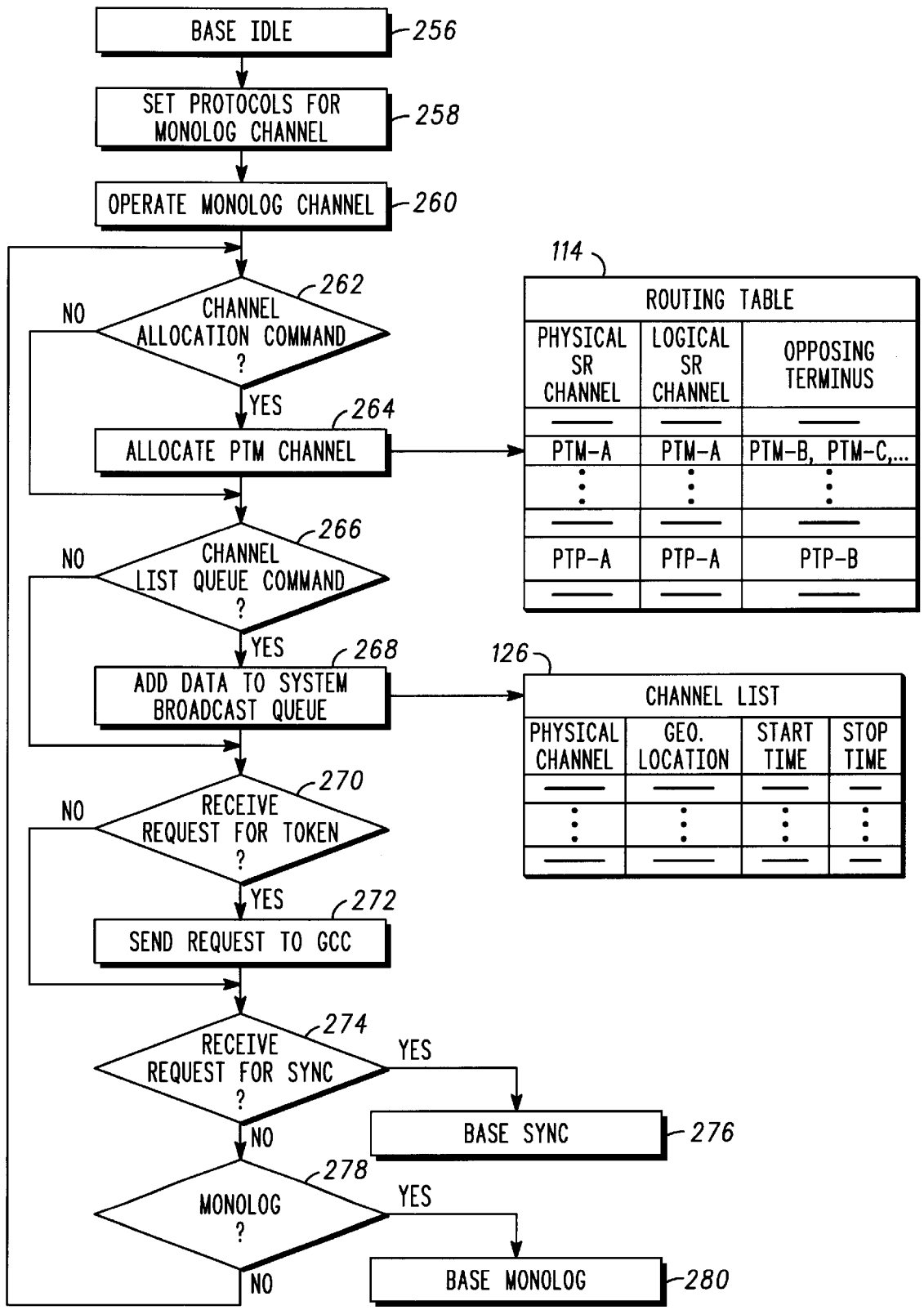
FIG. 9 shows a flow chart of a base idle process performed by a base station to support the state diagram of FIG. 7.

FIG. 9 shows a flow chart of a base idle process 256 performed by base stations 32 to support the state diagram of FIG. 7. Each base station 32 desirably practices a process similar to process 256, and process 256 is desirably practiced concurrently with other processes, such as base station PTP process 98 (FIG. 4). Base idle process 256 cooperates in the implementation of idle state 184 (FIG. 7). Process 256 performs a task 258 to set the broadcast and access protocols upon which forward link 54 and reverse link 56 of the multipoint channel 52 operate during idle state 184.

Following task 258, a task 260 operates forward and reverse links 54 and 56 of allocated multipoint channels 52 in accordance with the specified protocols. In particular, base station 32 broadcasts system data over forward link 54 and monitors reverse link 56 for access messages.

Next, a query task 262 determines whether a channel allocation command has been received from group control computer 28 (FIG. 1). Such commands are issued from time-to-time and routed to base station 32 through cellular radio infrastructure 22 as cells 48 (FIG. 1) move over a group coverage area. If such a command is detected, a task 264 allocates a multipoint channel 52 in routing table 114 as commanded and sends a return message to group control computer 28 indicating the identity of the physical channel allocated. Routing table 114 may be configured to include any number of opposing termini corresponding to other multipoint channels 52 active in other beams 46 (FIG. 1) for the same and other base stations 32. The channel allocation command may also convey data which causes previously allocated multipoint channels 52 to be de-allocated. Such commands may be issued when the cells 48 (FIG. 1) within which multipoint channels 52 reside move away from the group coverage area. Unlike base station PTP process 98 (FIG. 4), the allocation of a multipoint channel 52 does not directly cause PTM subscriber radios 24 to consume power maintaining the allocated channel as occurs for a PTP channel allocated to a PTP subscriber radio 26.

After task 264 and when task 262 determines no channel allocation command was received, a query task 266 determines whether a channel list queue command has been received. When a channel list queue command is detected, a task 268 adds channel list data conveyed in the command to the queue of data which is broadcast over forward link 54 at task 260. The channel list queue command is received from group control computer 28 through cellular radio infrastructure 22 from time to time to keep a channel list 126 being maintained in base station 32 current. The channel list queue command provides list entries which associate physical channel identities with geographical locations for multipoint channels and with timing data that indicate when the indicated multipoint channels will be active at the indicated locations. The performance of task 268 may also weed out stale data from channel list 126.

Following task 268 and when task 266 fails to detect a channel list queue command, a query task 270 determines whether a request for a token has been received in accordance with the access protocol over reverse channel 56 of multipoint channel 52. Any such token request is not a request to access multipoint channel 52 because the request is received over multipoint channel 52 to which access has already been granted. Rather, it is a request to originate a monolog using a the UL-traffic protocol over the same multipoint channel 52. When a token request is detected, a task 272 sends the request through cellular radio infrastructure 22 to group control computer 28, where the request will be granted unless some contention exists with a previously granted token or a higher priority requester.

Following task 272 and when task 270 fails to detect a token request, a query task 274 determines whether a request has been received for transitioning to sync state 186 (FIG. 7). A sync request may be received when group control computer 28 grants a token request or when the originating PTM subscriber radio 24 sends a message to the serving base station 32 over reverse link 56 using the access protocol. If a sync request is detected, program flow proceeds to a base sync process 276, discussed below.

When task 274 fails to detect a sync request, a query task 278 determines whether multipoint link 52 should be operated in one of monolog states 188 or 190 (FIG. 7). Task 278 may make its determination by detecting or failing to detect signaling which grants the token to any group member. If task 278 decides that multipoint link 52 should be operated in a monolog state 188 or 190, program flow proceeds to a base monolog process 280, discussed below. When task 278 decides not to operate multipoint link 52 in a monolog state 188 or 190, program flow loops back to task 262.

Figures 10, 11:
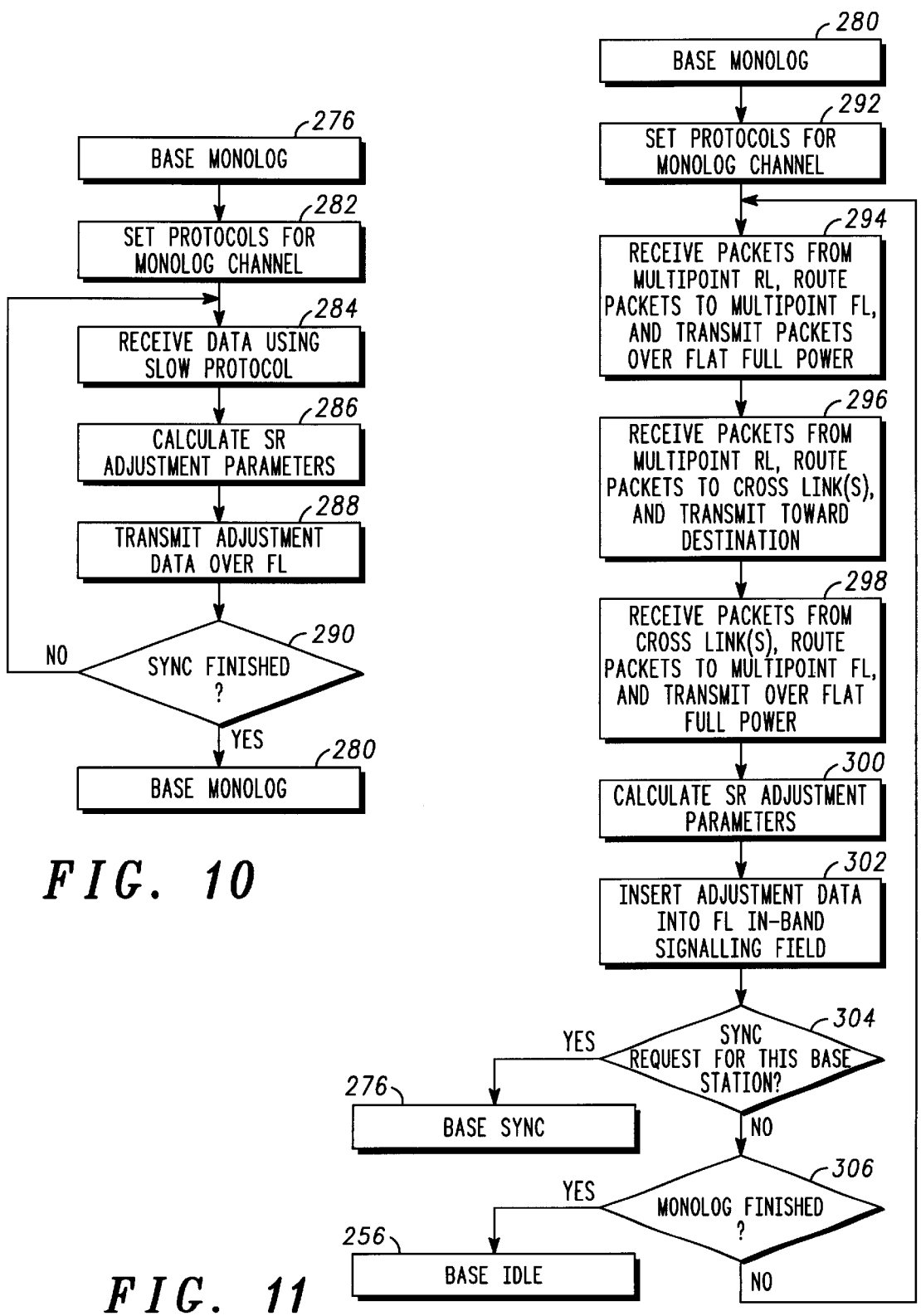
FIG. 10 shows a flow chart of a base sync process performed by a base station to support the state diagram of FIG. 7.
FIG. 11 shows a flow chart of a base monolog process performed by a base station to support the state diagram of FIG. 7.

FIG. 10 shows a flow chart of base sync process 276, performed by base stations 32 to support the state diagram of FIG. 7. Each base station 32 desirably practices a process similar to process 276, and process 276 is desirably practiced concurrently with other processes, such as base station PTP process 98 (FIG. 4). Base sync process 276 cooperates in the implementation of sync state 186 (FIG. 7). Process 276 performs a task 282 to set the DL-sync and UL-sync protocols upon which forward link 54 and reverse link 56 of the multipoint channel 52 operate during sync state 186.

After task 282, a task 284 commences the receipt of data in accordance with the relatively slow baud, UL-sync protocol practiced on reverse link 56. Next, a task 286 calculates subscriber radio transmitter adjustment parameters, such as offsets to power level, carrier frequency, and time slot timing. The adjustment parameters are configured so that if implemented in PTM subscriber radio 24 they should cause the signal received over reverse link 56 to more closely match reception standards practiced by base station 32 at the instant task 284 was previously performed. Following task 286, a task 288 transmits the adjustment data over forward link 54 using the DL-sync protocol, and a query task 290 determines whether the sync mode of operation is finished. The sync mode is declared finished when the adjustment parameters command adjustments less than a predetermined threshold. So long as large adjustments are being commanded, program control loops back to task 284, and operation continues in the sync mode. When the sync mode is declared to be finished, a message indicating that the sync mode has finished may be transmitted to PTM subscriber radio 24 over forward link 54 and program control passes to base monolog process 280 to begin operation in the monolog mode.

FIG. 11 shows a flow chart of base monolog process 280, which is performed by base stations 32 to support the state diagram of FIG. 7. Each base station 32 desirably practices a process similar to process 280, and process 280 is desirably practiced concurrently with other processes, such as base station PTP process 98 (FIG. 4). Base monolog process 280 cooperates in the implementation of monolog states 188 and 190 (FIG. 7), there being no difference from the perspective of base station 32. Process 280 performs a task 292 to set the DL-traffic and UL-traffic protocols upon which forward link 54 and reverse link 56 of the multipoint channel 52 operate during states 188 and 190. As discussed above, target PTM subscriber radios 24 do not transmit over reverse link 56, listen to monolog packet data received over forward link 54, and pay little attention to in-band signaling. The originating PTM subscriber radio 24 transmits over reverse link 56, pays little attention to the monolog packet data received over forward link 54, but adjusts transmission parameters in response to data received over an in-band channel portion of the DL-traffic protocol.

Following task 292 related tasks 294, 296 and 298 are performed. Task 294 receives any packets provided over reverse link 56, routes such packets to forward link 54, and transmits the packets at full power from base station 32. Transmission occurs at full power and is not modulated because numerous PTM subscriber radios 24 at various locations in the cell 48 within which multipoint channel 52 is active, monitor forward link 54. Modulation of power level away from a full power delivery may cause outlying PTM subscriber radios 24 to fail to successfully receive forward link 54. Task 296 receives any packets provided over reverse link 56, routes such packets to cross links 42 (FIG. 1) as necessary to route the packets to all termini indicated in routing table 114 (FIG. 9), and transmits the packets toward their destinations. Task 298 receives any packets which may arrive over cross links 42 addressed to multipoint channel 52, routes such packets to forward link 54, and transmits at full power.

Accordingly, monolog data packets are received from the originating subscriber radio 24 at one of base stations 32, transmitted back down over the forward link 54 of the same multipoint channel 52 from which they are received, and transmitted over cross links 42 toward multipoint channels 52 allocated in other beams 46 (FIG. 1) of cellular radio infrastructure 22. Likewise, monolog data packets arriving at a base station 32 addressed to an allocated multipoint channel 52 of that base station 32 are transmitted over the forward link 54 of that multipoint channel 52. Multiple base stations 32 transmit substantially identical information over different multipoint channels 52.

After tasks 294, 296 and 298, a task 300 practiced in the base station 32 serving the originating PTM subscriber radio 24 calculates subscriber radio transmitter adjustment parameters for the originating PTM subscriber radio 24. Next, in a task 302, the transmitter adjustment data from task 300 are inserted into the forward link in-band signaling field specified by the DL-traffic protocol, whereupon they will be transmitted over forward link 54.

After task 302, a query task 304 determines whether a sync request has been received for this base station 32. Such a sync request may be received when an originating PTM subscriber radio 24 changes multipoint channels 52 to a multipoint channel 52 for a different satellite 34. The new multipoint channel 52 will exhibit different Doppler and propagation delay than that to which the originating PTM subscriber radio 24 was previously synchronized. Accordingly, the base sync process 276 is performed for a brief period to enable the originating PTM subscriber radio 24 to capture the different satellite's signal, then base monolog process 280 is again performed.

When task 304 fails to detect a sync request, a query task 306 determines whether the monolog mode is finished. The monolog mode is finished when the token is released, as determined by monitoring signaling data. So long as the monolog is not finished, program flow loops back to task 294 to continue base monolog process 280. When the monolog mode is finished, program flow returns to base idle process 256 (FIG. 9). No de-allocation of multipoint channels 52 occurs.

In summary, the present invention provides an improved group radio system with subscriber-radio controlled channel selection. The system efficiently uses the spectrum because reverse link capacity need not be provided to accommodate system overhead communications dedicated to channel selection. Consequently, the system may be scaled to accommodate virtually any number of PTM subscriber radios. The system efficiently uses an existing cellular radio infrastructure and allows both PTP and PTM communications to take place simultaneously using the channels that are available to the cellular radio infrastructure. The efficiencies gained by using an existing infrastructure and by extensive channel sharing lead to reduced costs for providing PTM services. On the other hand, the system has no requirement for a terrestrial infrastructure, and the system of the present invention may establish PTM groups in remote areas where no terrestrial infrastructure exists. Power consumption is reduced by having PTM subscriber radios select the multipoint channels upon which they operate without emitting transmissions to the cellular radio infrastructure. The support of a large number of PTM subscribers on a single multipoint channel also conserves base station power requirements. Moreover, latency associated with PTM communication session management is reduced because multipoint channels are allocated to PTM communication sessions, rather than to individual monologs, and only to the extent that the cellular infrastructure is prevented from using the channels elsewhere. Time-consuming call setup processes need not be performed for each monolog. A reliable PTM system is provided because channel selection decisions are based, at least in part, on timing and/or geographical location which makes the PTM subscriber radios less vulnerable to rapidly fading channels. Moreover, multipoint channels are predicted rather than detected by scanning, allowing a rapid switching process which need not usurp significant receiver time away from listening to a multipoint channel. In addition, the system supports a coverage area for PTM groups which can be expanded up to worldwide, can incorporate remotely located groups, or can be limited to a group clustered together in one small area.

Although the preferred embodiments of the present invention have been illustrated and described in detail, it will be readily apparent to those skilled in the art that various modifications and equivalents may be made therein without departing from the spirit of the invention or from the scope of the appended claims.

What is claimed is:

1. A method of operating a subscriber radio in cooperation with a cellular radio infrastructure that uses a plurality of channels to cause said subscriber radio to function in a point-to-multipoint radio group, said method comprising:

a) receiving a point-to-multipoint monolog originating from outside said cellular radio infrastructure over a first one of said plurality of channels used by said cellular radio infrastructure;

b) identifying, during said receiving activity a), a second one of said plurality of channels used by said cellular radio infrastructure without transmitting to said cellular radio infrastructure;

c) receiving said point-to-multipoint monolog over said second one of said channels following said identifying activity b); and d) synchronizing, after receiving step a said first point-to-multipoint monolog, a transmitter of said subscriber radio to said cellular radio infrastructure by transmitting data from said subscriber radio to said cellular radio infrastructure at a first data rate.

2. A method as claimed in claim 1 wherein said point-to-multipoint monolog is a first point-to-multipoint monolog, and said method additionally comprises originating, after said synchronizing activity, a second point-to-multipoint monolog from said subscriber radio by transmitting data from said subscriber radio to said cellular radio infrastructure at a second data rate, said second data rate being greater than said first data rate.

3. A method as claimed in claim 2 wherein said receiving activity c) occurs over a forward link of said second one of said plurality of channels and said originating activity takes place over a reverse link of said second one of said plurality of channels.

4. A method as claimed in claim 3 additionally comprising:

receiving, during said originating activity, adjustment parameters over said forward link of said second one of said plurality of channels; and adjusting, during said originating activity, said transmitter portion of said subscriber radio in response to said adjustment parameters.

5. A method as claimed in claim 1 wherein:

said method additionally comprises obtaining, prior to said receiving activity a), a list which identifies a subset of said plurality of channels used by said cellular radio infrastructure in association with timing data which identify when said subset of said plurality of channels is active;

said identifying activity b) determines a current time; and said identifying activity b) identifies said second one of said plurality of channels in response to said list and said current time.

6. A method as claimed in claim 5 wherein:

said list additionally associates geographical locations with said subset of said plurality of channels;

said identifying activity b) determines a current geographical location for said subscriber radio; and said identifying activity b) identifies said second one of said plurality of channels in response to said current geographical location.

7. A method as claimed in claim 5 wherein said identifying activity b) comprises verifying an adequate signal quality for said second one of said plurality of channels prior to performing said receiving activity c).

8. A method as claimed in claim 7 wherein said verifying activity is configured so that said adequate signal quality for said second one of said plurality of channels is determined independently of signal quality for said first one of said plurality of channels.

9. A method of operating a subscriber radio in cooperation with a cellular radio infrastructure that uses a plurality of channels to cause said subscriber radio to function in a point-to-multipoint radio group, said method comprising:

a) obtaining a list which identifies a subset of said plurality of channels used by said cellular radio infrastructure in association with timing data which identify when said subset of said plurality of channels are active;

b) listening, after said obtaining activity a), to a first one of said subset of said plurality of channels;

c) identifying, during said listening activity b) and in response to said timing data of said list, when to switch to a second one of said subset of said plurality of channels; and d) listening, after said identifying activity c), to said second one of said subset of said plurality of channels.

10. A method as claimed in claim 9 wherein:

said list additionally associates geographical locations with said subset of said plurality of channels;

said identifying activity c) determines a current geographical location for said subscriber radio; and said identifying activity c) identifies said second one of said subset of said plurality of channels in response to said current geographical location.

11. A method as claimed in claim 9 wherein said identifying activity c) comprises verifying an adequate signal quality for said second one of said subset of said plurality of channels prior to performing said identifying activity c).

12. A method as claimed in claim 11 wherein said verifying activity is configured so that said adequate signal quality for said second one of said subset of said plurality of channels is determined independently of signal quality for said first one of said subset of said plurality of channels.

13. A method as claimed in claim 9 wherein:

said listening activities b) and d) together cause said subscriber radio to hear a first point-to-multipoint monolog originating from outside said cellular radio infrastructure;

said method additionally comprises synchronizing, after listening step b said first point-to-multipoint monolog, a transmitter of said subscriber radio to said cellular radio infrastructure by transmitting data from said subscriber radio to said cellular radio infrastructure at a first data rate; and said method additionally comprises originating, after said synchronizing activity, a second point-to-multipoint monolog from said subscriber radio by transmitting data from said subscriber radio to said cellular radio infrastructure at a second data rate, said second data rate being greater than said first data rate.

14. A method as claimed in claim 13 wherein said listening activity d) occurs over a forward link of said second one of said subset of said plurality of channels and said originating activity takes place over a reverse link of said second one of said subset of said plurality of channels.

15. A method as claimed in claim 14 additionally comprising:

receiving, during said originating activity, adjustment parameters over said forward link of said second one of said subset of said plurality of channels; and adjusting, during said originating activity, said transmitter of said subscriber radio in response to said adjustment parameters.

16. A radio communication system comprising:

a cellular radio infrastructure that uses a plurality of channels throughout a radio coverage area, said plurality of channels each having a forward link and a reverse link;

a plurality of subscriber radios located in said radio coverage area, said plurality of subscriber radios each being configured to communicate with said cellular radio infrastructure;

a group controller in communication with said plurality of subscriber radios through said cellular radio infrastructure, said group controller being configured to communicate to said plurality of subscriber radios a list of channels usable in said radio coverage area;

wherein, after communication of said list to said plurality of subscriber radios, one of said plurality of subscriber radios transmits a point-to-multipoint monolog to said cellular radio infrastructure over a reverse link of one of said plurality of channels identified in said list, and other ones of said plurality of subscriber radios receive said point-to-multipoint monolog from said cellular radio infrastructure over forward links of said plurality of channels identified in said list; and said other ones of said plurality of subscriber radios are configured to switch channels over which said point-to-multipoint monolog is received.

17. A radio communication system as claimed in claim 16 wherein:

said one of said plurality of subscriber radios transmits said point-to-multipoint monolog to said cellular radio infrastructure over said reverse link of a first one of said plurality of channels identified in said list; and one of said plurality of subscriber radios receives said point-to-multipoint monolog from said cellular radio infrastructure over a forward link of said first one of said plurality of channels identified in said list.

18. A radio communication system as claimed in claim 16 wherein said channels are switched without transmitting from said other ones of said plurality of subscriber radios to said cellular radio infrastructure.

19. A radio communication system as claimed in claim 18 wherein:

said group controller is configured so that said list identifies said channels usable in said radio coverage area in association with timing data which identify when said channels usable in said radio coverage area are active; and said other ones of said plurality of subscriber radios are configured to switch channels in response to said timing data of said list.

20. A radio communication system as claimed in claim 19 wherein:

said group controller is configured so that said list also identifies said channels usable in said radio coverage area in association with geographical data which identify where said channels usable in said radio coverage area are active; and said other ones of said plurality of subscriber radios are configured to switch channels in response to said geographical data of said list.

21. A radio communication system as claimed in claim 19 wherein said other ones of said plurality of subscriber radios are configured to verify an adequate signal quality of a channel not currently being received before switching to said channel.

22. A radio communication system as claimed in claim 21 wherein said other ones of said plurality of subscriber radios are further configured to verify said adequate signal quality of said channel not currently being received independently of signal quality for a channel currently being received.

23. A radio communication system as claimed in claim 16 wherein said cellular radio infrastructure comprises a plurality of base stations in moving orbits relative to a point on the surface of the Earth.

24. A radio communication system as claimed in claim 23 wherein said channels identified in said list are used at more than one of said plurality of base stations.

25. A radio communication system as claimed in claim 16 wherein said cellular radio infrastructure is configured to conduct point-to-point communications simultaneously with said point-to-multipoint monolog.

26. A method of operating a radio communication system to provide point-to-multipoint communications for a plurality of terrestrially-located subscriber radios each of which communicate with a cellular radio infrastructure having base stations implemented in satellites orbiting the Earth, said method comprising the steps of:

generating a list which identifies channels usable in communicating with said cellular radio infrastructure in association with timing data that indicate when said channels are active and geographical data that indicate where said channels are active;

providing said list to said plurality of terrestrially-located subscriber radios through said cellular radio infrastructure;

initiating a point-to-multipoint monolog in which one of said plurality of terrestrially-located subscriber radios transmits over one of said channels identified in said list and others of said plurality of terrestrially-located subscriber radios receive over said one of said channels and over others of said channels identified in said list;

identifying, in at least a portion of said others of said plurality of terrestrially-located subscriber radios while said point-to-multipoint monolog is being received and in response to said timing and geographical data of said list, when to switch channels upon which said point-to-multipoint monolog is being received and identities of channels to which to switch; and switching, in said at least a portion of said others of said subscriber radios during said point-to-multipoint monolog, channels upon which said point-to-multipoint monolog is received to said channels identified in said identifying step.

27. A method as claimed in claim 26 wherein said identifying step is performed without transmitting from said others of said plurality of terrestrially-located subscriber radios to said cellular radio infrastructure.

\* \* \* \* \*